US008562856B2

(12) United States Patent
Giannantonio et al.

(10) Patent No.: US 8,562,856 B2
(45) Date of Patent: *Oct. 22, 2013

(54) GETTER SYSTEMS COMPRISING A GAS-SORBING PHASE IN THE PORES OF A POROUS MATERIAL DISTRIBUTED IN A PERMEABLE MEANS

(75) Inventors: Roberto Giannantonio, Oleggio (IT); Giorgio Longoni, Monza (IT); Chiara Vescovi, Venegono Inferiore (IT); Lorena Cattaneo, Busto Arsizio (IT)

(73) Assignee: Saes Getters S.p.A., Lainate MI (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/995,156

(22) PCT Filed: Jul. 18, 2006

(86) PCT No.: PCT/IT2006/000539
§ 371 (c)(1),
(2), (4) Date: Jan. 9, 2008

(87) PCT Pub. No.: WO2007/013118
PCT Pub. Date: Feb. 1, 2007

(65) Prior Publication Data
US 2008/0210901 A1 Sep. 4, 2008

(30) Foreign Application Priority Data
Jul. 29, 2005 (IT) .............. MI2005A1500

(51) Int. Cl.
*H01J 7/18* (2006.01)
*H01J 35/20* (2006.01)
*H01K 1/56* (2006.01)
*C09K 3/00* (2006.01)
*B01J 31/00* (2006.01)
*B01J 37/00* (2006.01)
*B01J 20/00* (2006.01)
*C08F 4/02* (2006.01)
*C08F 4/60* (2006.01)

(52) U.S. Cl.
USPC ............... 252/181.2; 252/181.1; 252/181.6; 252/181.7; 252/194; 502/102; 502/402; 502/407; 502/414

(58) Field of Classification Search
USPC ........... 252/181.1, 181.2, 181.3, 181.4, 181.5, 252/181.6, 181.7, 194; 502/102, 402, 407, 502/414
See application file for complete search history.

(56) References Cited

U.S. PATENT DOCUMENTS

| | | |
|---|---|---|
| 3,704,806 A | 12/1972 | Plachenov et al. |
| 4,081,397 A | 3/1978 | Booe |
| 4,586,037 A | 4/1986 | Rosener et al. |
| 4,668,551 A | 5/1987 | Kawasaki et al. |
| 5,304,419 A | 4/1994 | Shores |
| 5,591,379 A | 1/1997 | Shores |
| 5,744,056 A * | 4/1998 | Venkateshwaran et al. ............ 252/188.28 |
| 5,837,158 A | 11/1998 | Shepodd et al. |
| 5,888,925 A | 3/1999 | Smith et al. |
| 5,977,212 A | 11/1999 | Ebner et al. |
| 6,226,890 B1 | 5/2001 | Boroson et al. |
| 6,258,883 B1 * | 7/2001 | Ebner et al. ............ 524/413 |
| 6,423,121 B1 * | 7/2002 | Kiyama et al. ............ 95/130 |
| 6,465,953 B1 | 10/2002 | Duggal |
| 6,686,006 B1 * | 2/2004 | Becraft et al. ............ 428/35.7 |
| 6,819,042 B2 | 11/2004 | Nakada et al. |
| 6,833,668 B1 | 12/2004 | Yamada et al. |
| 2004/0051449 A1 * | 3/2004 | Klausmann et al. ............ 313/512 |
| 2005/0046348 A1 * | 3/2005 | Lee et al. ............ 313/512 |
| 2005/0079166 A1 | 4/2005 | Damani et al. |

FOREIGN PATENT DOCUMENTS

| | | |
|---|---|---|
| EP | 1164644 A2 | 12/2001 |
| EP | 1912733 B1 | 4/2008 |
| JP | 60-132274 A | 7/1985 |
| JP | 08-183891 A | 7/1996 |
| JP | 2001-524566 A | 12/2001 |
| RU | 2146558 C1 | 3/2000 |
| RU | 2169606 C2 | 6/2001 |
| TW | 200719958 A | 6/2007 |
| WO | WO 2005050736 A1 * | 6/2005 ............ H01L 23/26 |
| WO | 2007013118 A1 | 2/2007 |

OTHER PUBLICATIONS

J.L.C. Roswell et al.; Metal-organic frameworks: a new class of porous materials; Microporous and Mesoporous Materials; 73: 3-14 (2004).
Office Action issued Jul. 6, 2010 in Japanese Application No. 2008-523546 (with English translation).
Int'l Search Report issued Nov. 6, 2006 in Int'l Application No. PCT/IT2006/000539.
Minutes of Oral Proceedings issued Jan. 12, 2012 in EP Application No. 06 766 387.2.
Summons to Oral Proceedings issued Jul. 26, 2011 in EP Application No. 06 766 387.2.
Office Action issued Jul. 14, 2009 in EP Application No. 06 766 387.2.
Int'l Preliminary Examination Report issued Nov. 2, 2007 in Int'l Application No. PCT/IT2006/000539.
Int'l Preliminary Report on Patentability issued Nov. 2, 2007 in Int'l Application No. PCT/IT2006/000539.
Office Action issued Oct. 23, 2009 in CN Application No. 200680025870.8.
Office Action issued May 12, 2011 in CN Application No. 200680025870.8.
Office Action issued Sep. 7, 2011 in CN Application No. 200680025870.8.
Office Action issued Apr. 12, 2012 in CN Application No. 200680025870.8.

(Continued)

*Primary Examiner* — Lorna M Douyon
*Assistant Examiner* — Tanisha Diggs
(74) *Attorney, Agent, or Firm* — Steinfl & Bruno LLP

(57) ABSTRACT

Getter systems are provided having a phase being active in the sorption of gas inserted in the pores of a porous material. The porous material is, in turn, dispersed in a polymeric means that is permeable to the gas to be sorbed.

11 Claims, 2 Drawing Sheets

(56) References Cited

OTHER PUBLICATIONS

Office Action issued Dec. 28, 2009 in KR Application No. 10-2007-7030342.

Office Action issued Aug. 30, 2011 in JP Application No. 2008-523546.

Office Action issued Jul. 13, 2009 in MY Application No. PI 20063660.

Office Action issued in RU Application No. 2008107713/15(008352).

Written Opinion issued Feb. 3, 2009 in SG Application No. 200800419-4.

Written Opinion issued Sep. 28, 2009 in SG Application No. 200800419-4.

Office Action issued Jul. 20, 2010 in SG Application No. 200800419-4.

Office Action issued Apr. 29, 2011 in TW Application No. 095126389.

Allowed claims in TW publication No. 200719958 (with English translation).

* cited by examiner

GETTER SYSTEMS COMPRISING A GAS-SORBING PHASE IN THE PORES OF A POROUS MATERIAL DISTRIBUTED IN A PERMEABLE MEANS

CROSS-REFERENCE TO RELATED APPLICATIONS

This application is a Section 371 of International Application No. PCT/IT2006/000539, filed Jul. 18, 2006, which was published in the English language on Feb. 1, 2007, under International Publication No. WO 2007/013118, which claims priority from Italian Application MI2005A 001500, filed Jul. 29, 2005, the disclosure of which is incorporated herein by reference.

BACKGROUND OF THE INVENTION

The present invention relates to getter systems comprising a phase active in gas sorption in the pores of a porous material distributed in a permeable means.

Getter materials and systems are widely used in industry in all applications where it is necessary to maintain a vacuum or to control the composition of a gaseous atmosphere through the sorption of traces of undesired gases.

Getter materials widely used for such purposes are porous materials, such as active carbons, particularly useful for the sorption of organic substances, or zeolites, silica or alumina, useful for the sorption of gaseous molecules having small size. Another class of particularly interesting compounds is comprised of anhydrous chemical desiccants, specific for moisture sorption, such as the oxides of alkaline-earth metals, or some hygroscopic salts such as chlorides (e.g., calcium chloride, $CaCl_2$), perchlorates (e.g., magnesium perchlorate, $Mg(ClO_4)_2$), or sulphates (e.g., calcium sulphate, $CaSO_4$).

One problem common to some of the materials used for the removal of gaseous impurities, such as water, oxygen or organic substances, is that they are generally in the form of powders without a cohesion sufficient to form compact bodies. This is particularly true in the case of desiccants after moisture sorption. This is a relevant problem, as in almost all foreseen industrial applications the absence of free particles is required.

The problem is in some cases tackled by inserting the getter material inside permeable containers (e.g., non-woven fabric envelopes, as shown for instance in U.S. Pat. No. 4,668,551 directed to insulating panels).

Another possible approach to the problem is to distribute the getter material inside a dispersing matrix, capable of retaining the getter particles in a fixed location while letting the gases pass towards the getter itself. Examples of this second solution are set forth in numerous documents. Japanese patent application publication JP 60-132274 discloses desiccant materials dispersed in a silicone matrix; U.S. Pat. No. 3,704,806 discloses desiccant compositions comprising zeolites dispersed inside a matrix formed of a thermosetting polymer, such as an epoxy resin; U.S. Pat. No. 4,081,397 discloses a desiccant system comprising particles of an oxide of an alkaline-earth metal dispersed in an elastomeric polymer; U.S. Pat. No. 5,304,419 discloses desiccant compositions comprising a desiccant material dispersed in a matrix that can be formed of silicone, polyurethanes or similar polymers; U.S. Pat. No. 5,591,379 discloses desiccant compositions comprising a desiccant chosen among zeolites, alumina, silica gel, alkaline-earth metal oxides and alkaline metal carbonates, dispersed in a matrix of porous glass or ceramic; U.S. Pat. No. 6,226,890 B1 discloses desiccant systems wherein a desiccant material (e.g., an alkaline-earth metal oxide) is dispersed in a polymer, selected for example from silicones, epoxides, polyamides, polymethylmethacrylates or others, which in the patent is said to have the property of not reducing or even increasing the sorption speed of water by the desiccant material; and finally, U.S. Pat. No. 6,819,042 B2 discloses desiccant systems comprised of a desiccant material dispersed in a resin, e.g., a polyethylene, polypropylene, polybutadiene or polyisoprene resin.

One limit that is common to many of the systems disclosed in these patents is that, due to the reaction with the gas to be sorbed, the getter material generally undergoes structural and morphological modifications, e.g. swellings, which, in particular in the case of desiccants, can be considerable. The presence of a matrix surrounding the particle of getter material can hinder these morphological modifications and inhibit or delay the gas sorption reactions.

In addition, some industrial applications may pose other requirements to getter systems. For instance, organic light emitting displays (OLEDs) of the latest generation require a getter system that is transparent and has constant optical properties throughout the whole life of the device, that is, soon after manufacture (when the getter material has not yet sorbed moisture, except for minimum amounts), near the end of the life of the device (when the getter device has already sorbed relatively large amounts of moisture, even up to the saturation of the system) and also at intermediate stages of the OLED life, that is when the various getter particles dispersed in the matrix have sorbed different amounts of moisture. The different level of moisture absorbed by getter particles during the OLED life can change optical properties of the system, such as its light transmission or refractive index, thus impairing the quality of the display. The problem is discussed, for example, in U.S. Pat. No. 6,465,953 disclosing a getter system for OLED, comprised of getter particles in a transparent matrix, wherein the particles have sufficiently small size not to interact with the luminous radiation. Given the importance of this application, in order to illustrate the uses of the getter systems of the invention reference will be particularly made to the use in OLEDs, but the getter systems of the invention are of a general use and may be also used in other applications.

BRIEF SUMMARY OF THE INVENTION

An object of the present invention is to provide a getter system for gas sorption.

According to the present invention, this and other objects are achieved with a getter system comprising:
  a polymeric means permeable to the gases to be sorbed;
  a powder of a porous material distributed in the polymeric means; and
  a phase active in the sorption of one or more gases in the pores of the porous material.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The getter systems of the invention are differentiated from those of the prior art in that the material being active in the sorption of gases is not directly dispersed in the matrix, but is present inside the pores of a "guest" phase, the latter being in the form of powders dispersed in the matrix. This feature ensures that the physical properties of the system are essentially invariant with respect to gas sorption. For example, although the active material may undergo morphological modifications during gas sorption, these modifications are not transmitted outside the individual porous particle, so that the interactions between the latter and the environment (the matrix) are not modified.

With respect to the known getter systems, in addition to the above-illustrated difference, the systems of the invention offer a number of advantages. First, if the dispersed porous material has well defined geometric features (e.g., in the case it is a natural or synthetic zeolite, fullerenes or the like), it is capable of transforming a reversible reaction or process into a non-reversible reaction or process due to the steric hindrance of the products and/or due to particularly high chemical forces exerted against the pore walls, such that the reaction products are tightly held in the pores. In addition, the porous material may receive a catalyst in addition to the active phase, thus ensuring mutual proximity, which is a particularly clear advantage if both the active phase and the catalyst are solid and thereby would have poor mobility if freely distributed in the polymeric means. Finally, in the case where the porous material is a zeolite, the zeolite itself can act as a catalyst (acid or basic according to Lewis and/or Broensted) for a wide class of reactions, thus supporting the reaction of the active phase with the gas to be sorbed, as explained below.

Figure 1:
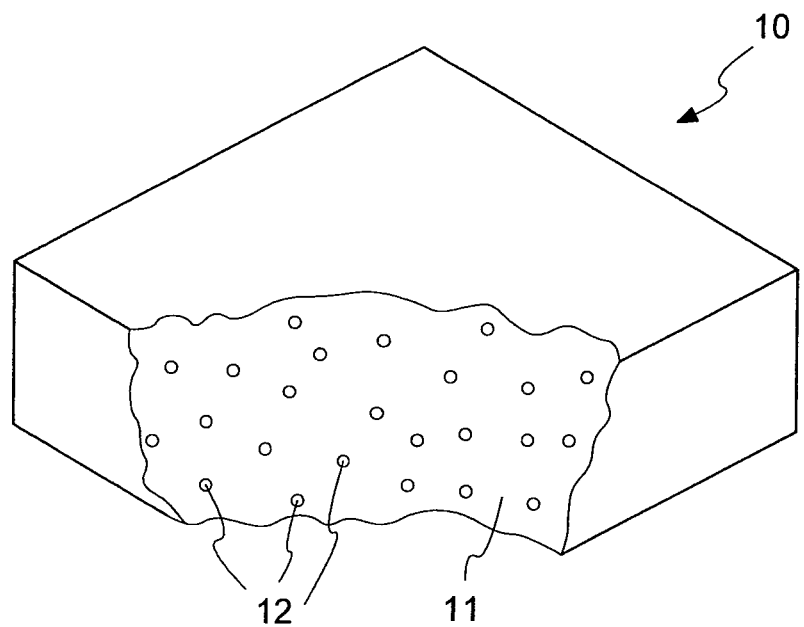
FIG. 1 is a partially broken away, schematic, perspective view illustrating an embodiment of a getter system of the invention.

In FIG. 1 a system of the invention is shown in a generic embodiment thereof. In this case, the system 10 is shown in the form of a short parallelepiped in a broken away view, but the system could have any other shape, e.g., a ribbon, a drop, or could be directly formed on an internal surface of the device whose atmosphere must be controlled, for example in the form of a thin layer, or occupy recesses of this surface.

The getter system is comprised of a polymeric means 11, permeable to the gas to be sorbed, inside which powders 12 of a porous material are distributed. The means 11 may be formed of any polymeric material being permeable to the gaseous species to be sorbed. Preferably, this polymer shows adhesive characteristics, so that it may be fixed onto an internal wall of the final device without using additional adhesives. Porous materials suitable for forming powders 12 useful for the purposes of the invention are for example the natural or synthetic zeolites, silicalites (i.e., substantially zeolites without aluminum), aluminosilicates other than zeolites, fullerenes and metal-organic frameworks (also known in the field as MOF; see for example the article "Metal-organic frameworks: a new class of porous materials," by J. L. C. Roswell and O. M. Yaghi, published on-line in *Microporous and Mesoporous Materials*, no. 73, pages 3-14, June 2004).

Figure 2:
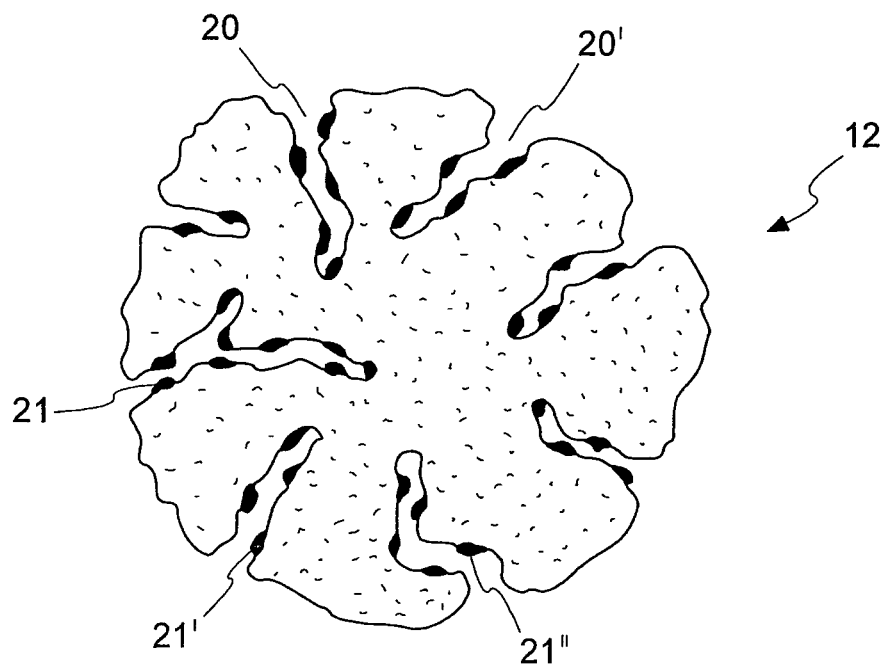
FIG. 2 is an enlarged, schematic, sectional view of a particle of the porous material powder used in an embodiment of the invention.

FIG. 2 schematically shows an enlarged sectional view of a particle 12. The particle of porous material shows pores 20, 20', . . . , inside which a phase active in gas sorption is arranged; the active phase being represented in the form of deposits 21, 21', 21", . . . . In the drawing the most general case is shown, wherein the pores are essentially in the form of channels having a variable section (between different pores and also in different locations inside the same pore) reaching the surface of the particle 12, and the deposits 21, 21', 21", . . . , adhere to the internal walls of the pores. Alternatively, for instance in the case of zeolites, the pores have dimensions that are rigidly fixed by the crystalline structure, which, as is known per se, may show cavities mutually connected through passages of reduced section, and the active phase could be simply arranged in the cavities, without being bonded to the internal surfaces of the same.

Figure 3A:
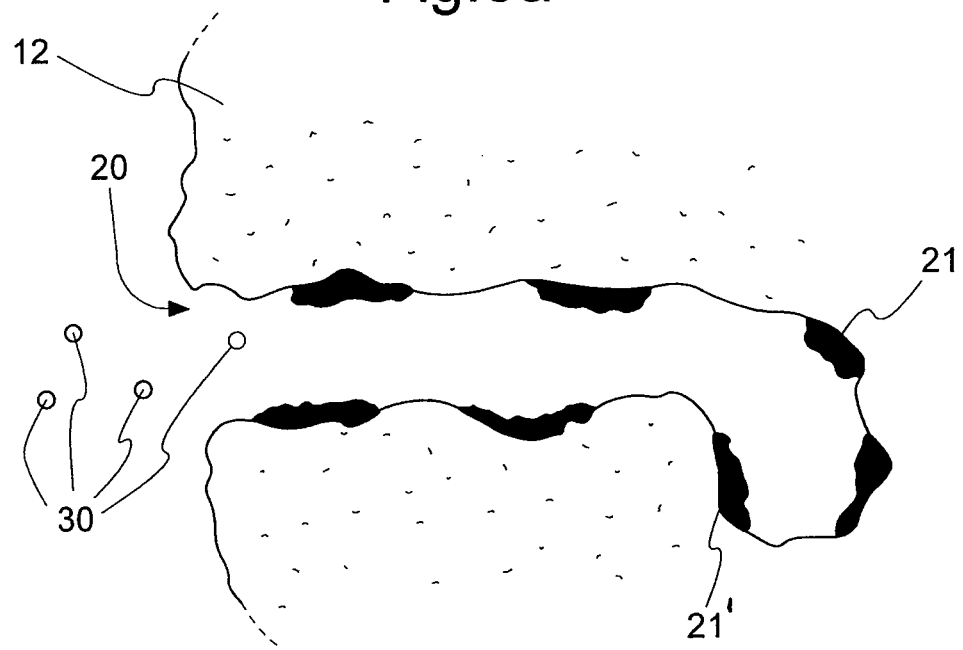
FIGS. 3a and 3b are further enlarged, schematic, sectional views illustrating the gas sorption reaction that takes place inside the pores of the particle of FIG. 2.
Figure 3B:
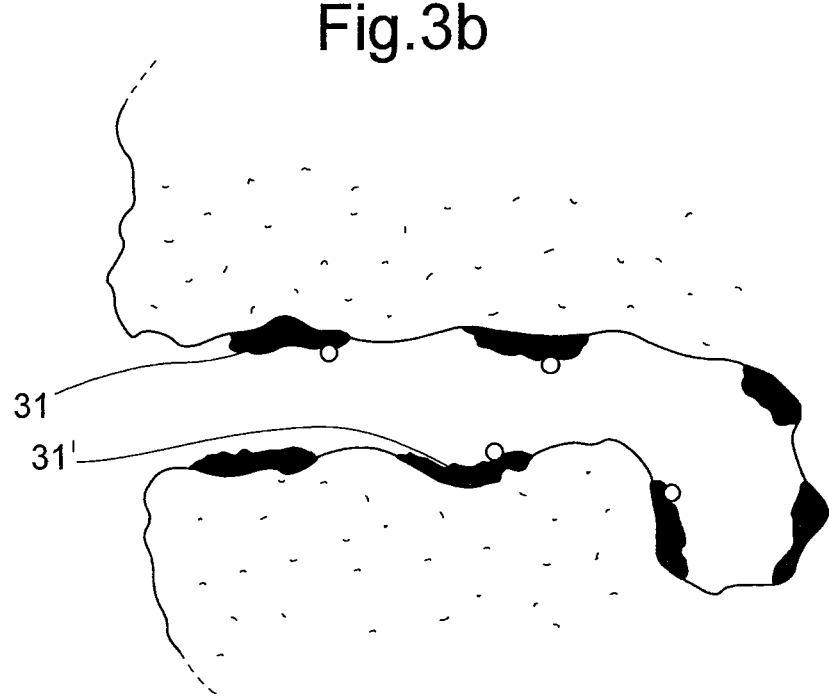

FIGS. 3a and 3b schematically show the operation mechanism of the getter systems of the invention. FIG. 3a shows, in a further enlarged view, a detail of particle 12, and in particular a pore 20, inside which deposits 21, 21', . . . of the active phase are present, while the molecules of the gaseous species to be sorbed are designated by 30. During their motion the molecules 30 contact the deposits 21, 21', . . . and react with them, thus being fixed on or by the deposits, with different mechanisms according to the nature of the components of the specific couple gaseous molecule/active phase. This situation is shown in FIG. 3b by the "modified" deposits 31, 31', . . . . In the case of zeolites, as previously said, the active phase could be present not in the form of a deposit, but rather in the form of particles "trapped" in the zeolite cavities, and the product of the reaction with the molecules 30 will be, in turn, in the form of a species trapped in the same cavities.

The chemical nature of the active phase depends on the species desired to be sorbed. For instance, in the case where the species to be sorbed is oxygen, the active phase can be formed of easily oxidizable metals, such as alkaline metals, alkaline-earth metals or other metals such as iron, tin and copper; metal oxides having low oxidation state such as manganese or copper oxide; salts with phosphite or phosphonite anion; or easily oxidizable organic compounds such as phenols, secondary aromatic amines, thioethers or aldehydes. In the case of carbon monoxide sorption, it is possible to use deposits of metals like nickel or iron, which form complexed species with this gas, or alkenes, amines and ketones, these latter in the presence of lithium-based organometallic compounds. In the case of carbon dioxide, the active phase can be a hydroxide of an alkaline or alkaline-earth metal. In the (unusual) case where it is necessary to sorb nitrogen, inorganic materials can be used such as lithium, barium or the compound $BaLi_4$; or porphyrins, namely, metallorganic molecules which have the ability of fixing this gas to the central metallic atom of the complex.

The most common and important case is, however, that of moisture removal. For this purpose, the active species can be chosen from a wide spectrum of materials, which work according to different sorption mechanisms, as summarized in the following list:

materials adding water: to this group belong epoxides; organic molecules with double or triple bonds (activated); oxides of alkaline metals, of alkaline-earth metals or of pseudo-alkaline-earth metals (i.e., essentially nickel, zinc and cadmium); organic (e.g. phthalic) and inorganic (e.g., boric) anhydrides;

materials undergoing hydrolysis or nucleophilic substitution: to this group belong for instance some alkoxides (e.g., of aluminum, $Al(OR)_3$), some halides (e.g., $AlCl_3$), acylic halides (and particularly chlorides) having general formula RCOX (where X is a halogen atom), or compounds forming carbocations;

materials reacting with water with dissociation thereof and with formation of either an oxide and a hydride or of a solid solution; examples of these materials are iron in the case of reaction with water, whereas, in the case of hydrogen sorption, yttrium, palladium or mixtures thereof;

materials being solvated by water, such as magnesium sulphate, or metallic centers present in zeolites in order to compensate the missing charge due to aluminum.

In a preferred embodiment, the getter systems of the invention have the further property of being transparent to visible radiation throughout their life, as previously described. In this mode, the systems of the invention are suitable for application in the previously cited screens of OLED type.

These preferred getter systems comprise:

an amorphous polymeric means being permeable to the gases to be sorbed;

powder of a porous material distributed in the polymeric means, with powder particles having a mean size less than 100 nanometers; and a phase active in the sorption of one or more gases in the pores of the porous material.

In this preferred embodiment, the components of the systems exhibit, as additional characteristics, the fact that the polymeric means is amorphous, whereas the porous material dispersed in the polymeric means is nano-sized, being formed of particles having a size on the order of about 100 nanometers or less. The reason for the first one of these two additional requirements is that polymers are transparent only if perfectly crystalline or completely amorphous. It is essentially impossible to obtain polymers being perfectly crystalline, especially in the case of the present invention wherein powder must be dispersed in the means, it is necessary to resort to polymers being completely amorphous. The second requirement comes from the fact that particles having dimensions of less than half the wavelength of the visible radiation do not cause interactions with the same, and thereby do not alter the transparency of the polymeric means.

Polymers suitable for manufacturing a permeable and transparent means are, for example, polyacrylates and polymethacrylates, polyetherimide (PEI), polyamides (PA), cellulose acetate (CA), tri-cellulose acetate (TCA), polysiloxanes (also known as silicones), polyvinylalcohols (PVAL), polyethyleneoxide (PEO), polyethyleneglycol (PEG), polypropyleneglycol (PPG), polyvinylacetate (PVAC), copolymers of polyethylene-vinylalcohol, and copolymers of PA-PEO and polyurethanes-PEO.

Generally, in order to obtain a permeable means, the cited polymers and their manufacturing processes are preferably selected among those allowing to obtain the maximum free volume of the polymeric means, the maximum order and regularity of the polymeric chains, the minimum cross-link rate, the minimum packing density, and the maximum interactions with the permeating species.

The systems of the invention may contain, in addition to the already cited components, additional elements improving some properties or supporting the achievement of the same.

For example, inside the pores of the porous material catalysts may be present, capable of accelerating the reactions between the species to be sorbed and the active phase. For example, in the case of the sorption of water by unsaturated organic molecules by addition to a double or triple bond, the catalyst could be an acid or a base according to Lewis or Broensted; metals like platinum and palladium can catalyze the sorption of hydrogen; other metals like nickel, iron, rhodium, ruthenium, copper or silver can also catalyze a variety of reactions involving an organic compound and a gas, both through the formation of coordination compounds involving the organic compound and/or the gas, and through redox mechanisms.

The systems of the invention may be produced by pre-impregnating the active phase in the porous material, and then forming suspensions of the so impregnated porous material in the polymeric means, if this is sufficiently poorly viscous. Alternatively, it is possible to prepare a suspension of the particles of the impregnated porous material in a solvent, wherein it is possible to solubilize the polymer also. The suitable solvents depend on the chosen polymer and are well known in organic chemistry. Examples of solvents are chloroform, acetone, tetrahydrofuran and toluene for polyacrylates and polymethacrylates; formic acid and N-methylpyrrolidone for polyamides; heptane or a mixture toluene/diethylether for polydimethylsiloxane. Alternatively, it is possible to form a suspension between the porous material pre-impregnated with the active phase and precursors of the polymer (e.g., oligomers or monomers which will form the polymer) and cause the polymer be formed in-situ, e.g. by radiating with UV radiation. In order to stabilize the suspensions, it is also possible to add suitable surfactants thereto, well known in organic chemistry and not requiring further descriptions. The starting solution (if this contains the polymer or its precursors), or the low viscosity polymer inside which the powders of the porous material are already present, may be poured into suitable molds, or directly in the final housing, for example onto a suitable internal surface of an OLED screen. Once the liquid mixture has been poured into the desired housing, it may be made to "solidify" (meaning as "solid," in this case, a material having a very high viscosity, such as to maintain the given shape) by extraction of the solvent, polymerization in-situ, or, if the low viscosity was achieved by maintaining the polymer in the melted state, by cooling.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A getter system for sorption of one or more gases, consisting of:

a polymer selected from polyacrylates and polymethacrylates, polyetherimide (PEI), polyamides (PA), cellulose acetate (CA), tri-cellulose acetate (TCA), polysiloxanes, polyvinylalcohols (PVAL), polyethyleneoxide (PEO), polyethyleneglycol (PEG), polypropyleneglycol (PPG), polyvinylacetate (PVAC), co-polymers of polyethylene-vinylalcohol and copolymers of PA-PEO and polyurethanes-PEO;

a powder of a porous material distributed in the polymer, wherein the porous material is selected from natural or synthetic zeolites, silicalites, aluminosilicates, fullerenes and metal-organic frameworks;

a phase active in the sorption of the one or more gases, wherein the phase is dispersed in pores of the porous material; wherein the system maintains transparency on variations of amount of the at least one sorbed gas, wherein the polymer is permeable to the at least one gas to be sorbed and is amorphous, and wherein the powder of porous material distributed in the polymer has a mean particle size of less than 100 nanometers, and optionally inside the pores, catalysts capable of accelerating reactions between the at least one gas to be sorbed and the active phase, and optionally a surfactant; wherein:

when the at least one gas to be sorbed is oxygen, the active phase is selected from easily oxidizable metals, metal oxides having low oxidation state, and salts with phosphite or phosphonite anion;

when the at least one gas to be sorbed is carbon monoxide, the active phase is selected from nickel, iron, alkenes, amines, and ketones, the ketones being in the presence of lithium-based organometallic compounds;

when the at least one gas to be sorbed is carbon dioxide, the active phase is a hydroxide of an alkaline or alkaline-earth metal;

when the at least one gas to be sorbed is nitrogen, the active phase is selected from lithium, barium, the compound $HaLi_4$ and porphyrins, and when the at least one gas to be sorbed is water, the active phase is selected from epoxides, alkaline metal oxides, compounds forming carbocations; alkaline-earth oxide metals or oxides of metals selected from nickel, zinc and cadmium; organic and inorganic anhydrides; alkoxides; hydrolyzable inorganic halides and acylic halides; mixtures of iron with another element selected from yttrium, palladium, and mixtures thereof; and magnesium sulphate.

2. The getter system according to claim 1, wherein the easily oxidizable metals are selected from alkaline metals, alkaline-earth metals, and other metals selected from iron, tin and copper.

3. The getter system according to claim 1, wherein the metal oxides having low oxidation state are selected from manganese and copper oxides.

4. The getter system according to claim 1, wherein the catalyst is selected from platinum, palladium, nickel, iron, rhodium, ruthenium, copper, and silver.

5. The getter system according to claim 1, wherein the catalyst is an acid or base according to Lewis or Broensted.

6. A process for preparation of the getter system of claim 1, comprising the steps of: pre-impregnating the active phase in the porous material and forming a suspension of the impregnated porous material directly in the polymer.

7. A process for preparation of the getter system of claim 1, comprising the steps of pre-impregnating the active phase in the porous material; forming a suspension of the impregnated porous material in a liquid solvent; dissolving the polymer in the suspension; and removing the solvent.

8. The process according to claim 7, wherein the solvent is selected from chloroform, acetone, tetrahydrofuran and toluene, when the polymer is selected from polyacrylates and polymethacrylates; formic acid and N-methylpyrrolidone, when the polymer is a polyamide; and heptane or toluene diethylether, when the polymer is a polydimethylsiloxane.

9. The process according to claim 7, wherein the suspension is stabilized by adding a surfactant.

10. A process for preparation of the getter system of claim 1, comprising the steps of: pre-impregnating the active phase in the porous material; forming a suspension of the impregnated porous material in a liquid solvent; dissolving the precursors of the polymer in the suspension; causing polymerization of the precursors to take place in the suspension; and removing the solvent.

11. The process according to claim 10, wherein the suspension is stabilized by adding a surfactant.

* * * * *